(12) United States Patent
Smith

(10) Patent No.: US 8,116,730 B2
(45) Date of Patent: Feb. 14, 2012

(54) SYSTEMS AND METHODS TO CONTROL ONLINE TRANSACTIONS

(75) Inventor: Glyn Barry Smith, Chesterfield (GB)

(73) Assignee: Vidicom Limited, Chesterfield (GB)

( * ) Notice: Subject to any disclaimer, the term of this patent is extended or adjusted under 35 U.S.C. 154(b) by 400 days.

(21) Appl. No.: 12/406,077

(22) Filed: Mar. 17, 2009

(65) Prior Publication Data

US 2010/0190471 A1    Jul. 29, 2010

Related U.S. Application Data

(60) Provisional application No. 61/146,924, filed on Jan. 23, 2009.

(51) Int. Cl.
*H04M 11/00* (2006.01)

(52) U.S. Cl. ...... 455/408; 455/41.2; 455/41.3; 455/406; 455/407; 455/414.1; 455/418; 455/466; 705/1.1; 705/7.26; 705/17; 705/26.1; 705/38; 705/44; 705/64; 705/67; 235/380; 726/4

(58) Field of Classification Search .......... 455/41.2, 455/41.3, 406, 407, 408, 422.1, 466, 418–420, 455/414.1; 705/1, 7, 17, 26, 38, 44, 64, 67; 235/380; 726/4
See application file for complete search history.

(56) References Cited

U.S. PATENT DOCUMENTS

| | | | |
|---|---|---|---|
| 5,845,260 A * | 12/1998 | Nakano et al. ............... | 705/17 |
| 5,905,873 A | 5/1999 | Hartmann et al. | |
| 5,914,472 A | 6/1999 | Foladare et al. | |
| 5,953,710 A * | 9/1999 | Fleming ...................... | 705/38 |
| 6,473,808 B1 | 10/2002 | Yeivin et al. | |
| 6,612,488 B2 * | 9/2003 | Suzuki ........................ | 235/380 |
| 6,718,178 B1 | 4/2004 | Sladek et al. | |
| 6,788,771 B2 | 9/2004 | Manto | |
| 6,807,410 B1 | 10/2004 | Pailles et al. | |
| 6,996,409 B2 | 2/2006 | Gopinath et al. | |
| 7,107,068 B2 | 9/2006 | Benzon et al. | |

(Continued)

FOREIGN PATENT DOCUMENTS

GB    2379525    3/2003

(Continued)

OTHER PUBLICATIONS

Amazon.com, Inc., "Get Gold Box Deals Every Day with Amazon Text Alerts," located at http://www.amazon.com/gp/anywhere/sms/goldbox, available at least by Jun. 10, 2009.

(Continued)

*Primary Examiner* — Steve D Agosta
(74) *Attorney, Agent, or Firm* — Stephen M. De Klerk

(57) ABSTRACT

Systems and methods are provided to control online transactions via mobile communications. In one aspect, a system includes a data storage facility to store data associating a first telephone number with a second telephone number; and an interchange coupled with the data storage facility. The interchange includes a common format processor and a plurality of converters to interface with a plurality of controllers. The converters are configured to communicate with the controllers in different formats and to communicate with the common format processor in a common format. The common format processor is to receive a payment request including the first telephone number, identify the second telephone number based on the data, and communicate with a mobile phone at the second telephone number for approval of the payment request.

36 Claims, 13 Drawing Sheets

U.S. PATENT DOCUMENTS

| | | | |
|---|---|---|---|
| 7,221,951 | B2 | 5/2007 | Anvekar et al. |
| 7,315,541 | B1 | 1/2008 | Housel et al. |
| 7,357,310 | B2 | 4/2008 | Calabrese et al. |
| 7,366,702 | B2* | 4/2008 | David ............................. 705/67 |
| 7,478,055 | B2 | 1/2009 | Goino |
| 7,890,433 | B2 | 2/2011 | Singhal |
| 2001/0003093 | A1 | 6/2001 | Lundin |
| 2001/0037264 | A1 | 11/2001 | Husemann et al. |
| 2002/0013727 | A1 | 1/2002 | Lee |
| 2002/0035539 | A1 | 3/2002 | O'Connell |
| 2002/0059146 | A1* | 5/2002 | Keech ............................. 705/64 |
| 2002/0087471 | A1 | 7/2002 | Ganesan et al. |
| 2002/0120582 | A1 | 8/2002 | Elston et al. |
| 2003/0065525 | A1 | 4/2003 | Giachhetti et al. |
| 2003/0119478 | A1 | 6/2003 | Nagy et al. |
| 2003/0125969 | A1 | 7/2003 | Kizer et al. |
| 2003/0126076 | A1 | 7/2003 | Kwok |
| 2004/0019564 | A1* | 1/2004 | Goldthwaite et al. .......... 705/44 |
| 2004/0044582 | A1 | 3/2004 | Chowdhary |
| 2004/0122685 | A1* | 6/2004 | Bunce ............................... 705/1 |
| 2004/0248596 | A1 | 12/2004 | Panchal |
| 2005/0055296 | A1 | 3/2005 | Hattersley et al. |
| 2005/0055309 | A1 | 3/2005 | Williams et al. |
| 2005/0177442 | A1 | 8/2005 | Sullivan et al. |
| 2005/0177517 | A1 | 8/2005 | Leung et al. |
| 2005/0199709 | A1 | 9/2005 | Linlor |
| 2005/0245257 | A1 | 11/2005 | Woodhill |
| 2006/0131390 | A1 | 6/2006 | Kim |
| 2006/0206709 | A1 | 9/2006 | Labrou et al. |
| 2006/0253335 | A1 | 11/2006 | Keena et al. |
| 2006/0259438 | A1 | 11/2006 | Randle et al. |
| 2006/0276171 | A1 | 12/2006 | Pousti |
| 2007/0005467 | A1 | 1/2007 | Haigh et al. |
| 2007/0022019 | A1 | 1/2007 | Sherwin et al. |
| 2007/0027775 | A1 | 2/2007 | Hwang |
| 2007/0027803 | A1 | 2/2007 | Brandes et al. |
| 2007/0043664 | A1 | 2/2007 | Wilkes |
| 2007/0055440 | A1 | 3/2007 | Denker et al. |
| 2007/0061244 | A1 | 3/2007 | Ramer et al. |
| 2007/0123219 | A1 | 5/2007 | Lovell, Jr. |
| 2007/0123229 | A1 | 5/2007 | Pousti |
| 2007/0130025 | A1 | 6/2007 | Nakajima |
| 2007/0130044 | A1 | 6/2007 | Rowan |
| 2007/0175978 | A1 | 8/2007 | Stambaugh |
| 2007/0198510 | A1 | 8/2007 | Ebanks |
| 2007/0203836 | A1 | 8/2007 | Dodin |
| 2007/0208632 | A1 | 9/2007 | Downes et al. |
| 2007/0244731 | A1 | 10/2007 | Barhydt et al. |
| 2007/0255653 | A1 | 11/2007 | Tumminard et al. |
| 2007/0260556 | A1 | 11/2007 | Pousti |
| 2007/0266034 | A1 | 11/2007 | Pousti |
| 2007/0266130 | A1 | 11/2007 | Mazur et al. |
| 2007/0270125 | A1 | 11/2007 | Pousti |
| 2008/0009263 | A1 | 1/2008 | Pousti |
| 2008/0010192 | A1 | 1/2008 | Rackley, III et al. |
| 2008/0040139 | A1 | 2/2008 | Pousti |
| 2008/0040733 | A1 | 2/2008 | Pousti |
| 2008/0052363 | A1 | 2/2008 | Pousti |
| 2008/0057904 | A1 | 3/2008 | Pousti |
| 2008/0082509 | A1 | 4/2008 | Bessieres et al. |
| 2008/0103984 | A1 | 5/2008 | Choe et al. |
| 2008/0109279 | A1 | 5/2008 | Csoka |
| 2008/0120698 | A1* | 5/2008 | Ramia ............................... 726/4 |
| 2008/0126145 | A1* | 5/2008 | Rackley, III et al. ............. 705/7 |
| 2008/0133735 | A1 | 6/2008 | Thayer et al. |
| 2008/0140569 | A1 | 6/2008 | Handel |
| 2008/0154772 | A1 | 6/2008 | Carlson |
| 2008/0167017 | A1 | 7/2008 | Wentker et al. |
| 2008/0189186 | A1* | 8/2008 | Choi et al. ...................... 705/26 |
| 2008/0189211 | A1* | 8/2008 | Obadia et al. .................. 705/44 |
| 2008/0201201 | A1 | 8/2008 | Pousti |
| 2008/0228595 | A1 | 9/2008 | Hill et al. |
| 2008/0233918 | A1 | 9/2008 | Pousti |
| 2008/0275779 | A1 | 11/2008 | Lakshminarayanan |
| 2008/0287095 | A1 | 11/2008 | Pousti |
| 2008/0288299 | A1 | 11/2008 | Schultz |
| 2009/0006184 | A1 | 1/2009 | Leach et al. |
| 2009/0006217 | A1 | 1/2009 | Smith |
| 2009/0024614 | A1 | 1/2009 | Pousti |
| 2009/0029687 | A1 | 1/2009 | Ramer et al. |
| 2009/0063178 | A1 | 3/2009 | Pousti et al. |
| 2009/0063312 | A1 | 3/2009 | Hurst |
| 2009/0070583 | A1 | 3/2009 | Von Mueller et al. |
| 2009/0081989 | A1 | 3/2009 | Wuhrer |
| 2009/0112765 | A1 | 4/2009 | Skowronek |
| 2009/0119190 | A1 | 5/2009 | Realinij |
| 2009/0124238 | A1 | 5/2009 | Wilson |
| 2009/0172402 | A1 | 7/2009 | Tran |
| 2009/0204546 | A1 | 8/2009 | Haidar |
| 2009/0220060 | A1 | 9/2009 | Wilson |
| 2009/0265273 | A1 | 10/2009 | Guntupali et al. |
| 2010/0010911 | A1 | 1/2010 | Smith |
| 2010/0015944 | A1 | 1/2010 | Smith |
| 2010/0015957 | A1 | 1/2010 | Smith |
| 2010/0017285 | A1 | 1/2010 | Smith |
| 2010/0094732 | A1 | 4/2010 | Smith |
| 2010/0190471 | A1 | 7/2010 | Smith |
| 2010/0191646 | A1 | 7/2010 | Smith |
| 2010/0191648 | A1 | 7/2010 | Smith |
| 2010/0216425 | A1 | 8/2010 | Smith |
| 2010/0217696 | A1 | 8/2010 | Schuba et al. |
| 2010/0223183 | A1 | 9/2010 | Smith |
| 2010/0235276 | A1 | 9/2010 | Smith |
| 2010/0250687 | A1 | 9/2010 | Smith |
| 2010/0267362 | A1 | 10/2010 | Smith et al. |
| 2010/0299220 | A1 | 11/2010 | Baskerville |
| 2010/0306015 | A1 | 12/2010 | Kingston |
| 2010/0306099 | A1 | 12/2010 | Hirson |
| 2010/0312645 | A1 | 12/2010 | Niejadlik |
| 2010/0312678 | A1 | 12/2010 | Davis |
| 2011/0022484 | A1 | 1/2011 | Smith et al. |
| 2011/0035302 | A1 | 2/2011 | Martell et al. |
| 2011/0071922 | A1 | 3/2011 | Hirson et al. |
| 2011/0078077 | A1 | 3/2011 | Hirson |
| 2011/0082772 | A1 | 4/2011 | Hirson |

FOREIGN PATENT DOCUMENTS

| | | |
|---|---|---|
| JP | 2007109014 | 4/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | 2007102648 | 9/2007 |
| WO | 2007127521 | 11/2007 |
| WO | 2009044396 | 4/2009 |
| WO | 2009102806 | 8/2009 |
| WO | 2009142833 | 11/2009 |
| WO | 2010085370 | 7/2010 |
| WO | 2010085371 | 7/2010 |
| WO | 2010085372 | 7/2010 |
| WO | 2010096221 | 8/2010 |
| WO | 2010110966 | 9/2010 |
| WO | 2010123690 | 10/2010 |
| WO | 2010135061 | 11/2010 |
| WO | 2010138217 | 12/2010 |
| WO | 2010138969 | 12/2010 |
| WO | 2010144481 | 12/2010 |
| WO | 2011011485 | 1/2011 |

OTHER PUBLICATIONS

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.

International Application No. PCT/US10/24525, International Search Report and Written Opinion, May 17, 2010.

International Application No. PCT/US10/57472, International Search Report and Written Opinion, Jan. 18, 2011.

International Application No. PCT/US10/59295, International Search Report and Written Opinion, Feb. 1, 2011.
International Application No. PCT/US10/59466, International Search Report and Written Opinion, Feb. 1, 2011.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
International Application No. PCT/US11/22426, International Search Report and Written Opinion, Mar. 28, 2011.
International Application No. PCT/US11/22419, International Search Report and Written Opinion, Mar. 29, 2011.
Mobilians Co. Ltd., company website located at http://www.mobilians.co.kr/english/, available at least by Jan. 12, 2009.

PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawsky J, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.

* cited by examiner

SYSTEMS AND METHODS TO CONTROL ONLINE TRANSACTIONS

The present application claims priority to Provisional U.S. Patent Application Ser. No. 61/146,924, filed Jan. 23, 2009 and entitled "Systems and Methods to Control Online Transactions," the disclosure of which is hereby incorporated herein by reference.

FIELD OF THE TECHNOLOGY

At least some embodiments of the disclosure relate to mobile communications in general and, more particularly but not limited to, mobile communications to control online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to control online transactions via mobile communications. Some embodiments are summarized in this section.

In one aspect, a system includes a data storage facility to store data associating a first telephone number with a second telephone number; and an interchange coupled with the data storage facility. The interchange includes a common format processor and a plurality of converters to interface with a plurality of controllers. The converters are configured to communicate with the controllers in different formats and to communicate with the common format processor in a common format.

The common format processor is to receive a payment request including the first telephone number and to identify the second telephone number based on data stored in the data storage facility, the data associating the first telephone number and the second telephone number. The common format processor is to instruct a first controller of the controllers, via a first converter of the converters, and to communicate with a mobile phone at the second telephone number for approval of the payment request, where the system is to process the payment request using funds collected via the second telephone number, in response to the payment request being approved via the mobile phone at the second telephone number.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange is coupled with a data storage facility that stores data associating two or more telephone numbers of mobile devices, such as cellular phones, operated by different users. The interchange allows one of the mobile devices to control the purchase requests confirmed via the other mobile devices and/or to provide funds for the approved purchase requests. The interchange can be used to associate account information with phone numbers to facilitate electronic payments via the mobile devices, or to collect funds via the phone bills of the mobile devices. The interchange is configured to communicate with the mobile phones through the different controllers to provide security and convenience for online transactions.

Figure 1:
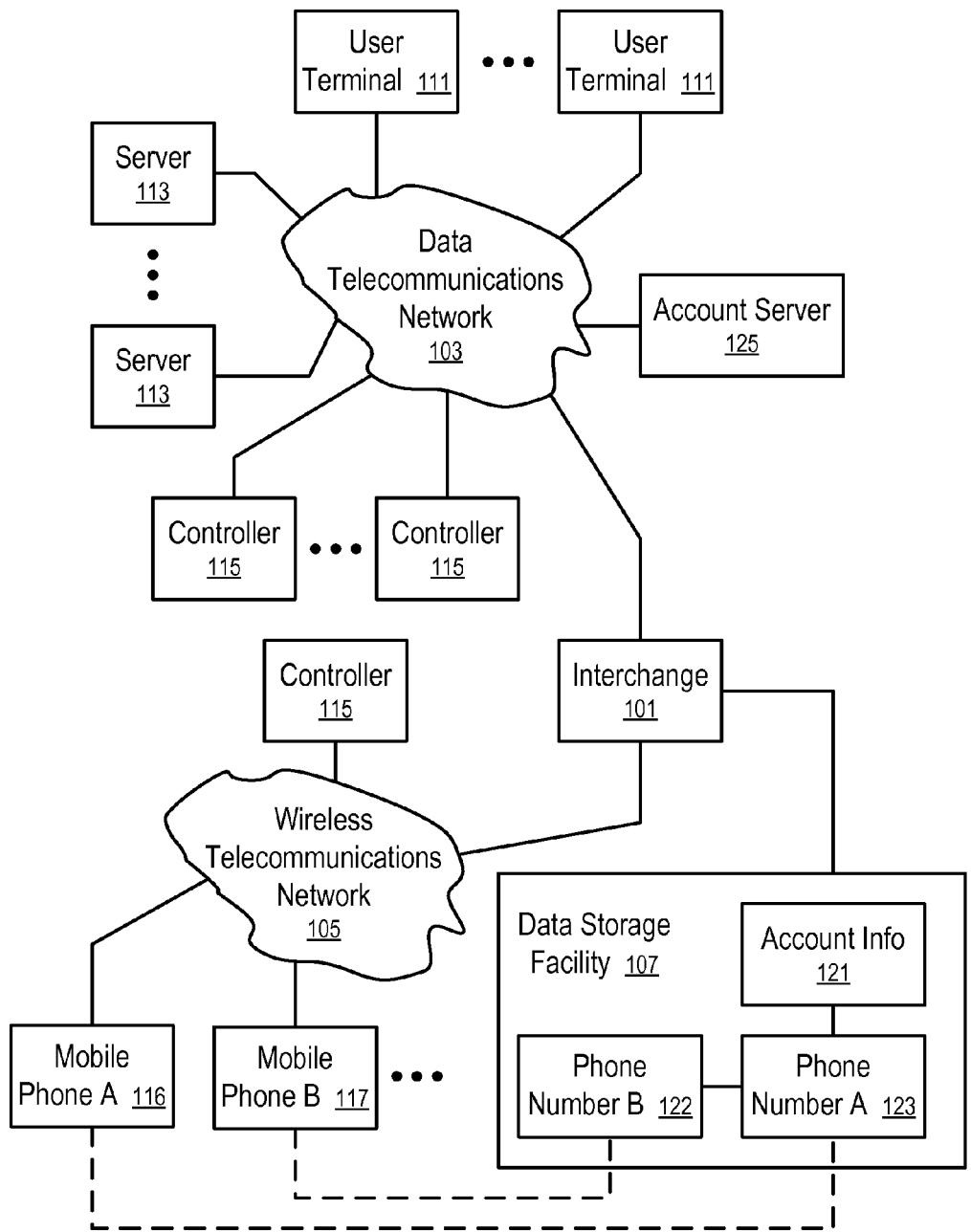
FIG. 1 shows a system to control online transactions according to one embodiment.

FIG. 1 shows a system to facilitate online transactions according to one embodiment. In FIG. 1, an interchange (101) is provided to interface with a plurality of different controllers (115) for communications with the mobile phones (e.g., 116, 117, etc.) over the wireless telecommunications network (105).

In FIG. 1, a data storage facility (107) stores user account information (121) and the corresponding phone number (123) of the mobile phone (116). The data storage facility (107) also stores data to associate the phone number (122) with the phone number (123). In FIG. 1, the mobile phone (117) can be reached at the phone number (122).

In one embodiment, different telecommunication carriers provide telecommunication services to the mobile phones (116 and 117). For example, the mobile phone (116) may be with a first telecommunication carrier in a first country; and the mobile phone (116) may be with a second telecommunication carrier in a second country different from the first country. In other embodiments, the same telecommunication carrier may provide telecommunication services to the mobile phones (116 and 117). In one embodiment, the controllers (115) are operated by the telecommunication carriers of the mobile phones (e.g., 116, 117, etc.).

FIG. 1 illustrates one group of mobile phones (116 and 117) that are associated with each other via the data in the data storage facility. However, a group may have more than two mobile phones; and the data storage facility may store data to associate multiple groups of mobile phones.

In FIG. 1, the interchange (101) is coupled with the data storage facility (107) to communicate with the mobile phone (117) at the corresponding phone number (122) to confirm purchases requests and to communicate with the mobile phone (116) at the corresponding phone number (123) to approve the purchase request, which is to be funded by the account associated with the phone number (123).

In one embodiment, the account information (121) includes the account numbers of financial accounts with banking systems, such as bank accounts, credit card accounts, debit card accounts, and others. Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In some embodiments, the funds for the purchase requests are collected via the phone bill of the mobile phone (123). For example, the interchange (101) may send a set of premium messages to the mobile phone (123) to collect the funds via the premium messages. Alternatively, the interchange (101) may request the mobile phone (123) to send a set of premium messages to the interchange (101) to provide the funds. Alternatively, the interchange (101) may communicate with the telecommunication carrier of the mobile phone (123) to charge an amount on the monthly phone bill of the mobile phone, or to deduct an amount from the prepaid amount of the mobile phone.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to approve and fund the purchases confirmed by the associated mobile phone (117). In some embodiments, the user of the mobile phone (116) may also directly confirm, approve and fund the purchases.

In FIG. 1, the user terminals (111) may use a unified interface to send requests to the interchange (101). The user terminals (111) are typically different from the mobile phones. However, in some embodiments, users may use the mobile phone (117) to access the web and submit the account information (121).

For example, a website of the interchange (101) may be used to receive the account information (121) and/or the indication of the association between the phone numbers (122 and 123) from the web browsers running in the user terminals (111). Alternatively, the users may use the mobile phone (117) to submit the account information (121) to the interchange (101) via text messaging, email, instant messaging, etc.

Alternatively, the indication of the association between the phone numbers (122 and 123) may be received from the mobile phone (116 or 117), or from the telecommunication carrier of the mobile phone (116 or 117) (e.g., when the mobile phones share a phone bill).

The use of the mobile phones (116 and 117) in the confirmation and approval of activities that involve the account information (121) increases the security of the transaction, since the mobile phones (116 and 117) are typically secured in the possession of the users.

For the convenience of the users, the interchange (101) may use the phone bills of the mobile phones (117) to pay for purchases in one embodiment, use the account information (121) to pay for the phone bills, and/or deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phone (116) via the phone number (123) stored in the data storage facility (107) and the mobile phone (117) is associated with the mobile phone (116) via the association between the phone numbers (122 and 123) in the data storage facility (107), the user of the mobile phone (117) may use the user terminal (111) to access online servers (113) of various merchants or service providers to make purchases and have the purchases funded by the user of the mobile phone (116).

For example, the user of the mobile phone (117) may confirm the purchase via the mobile phone (117). Once the purchase request is confirmed via the mobile phone (117), the user of the mobile phone (116) may approve the purchase request via the mobile phone (116). Once the purchase request is confirmed and approved, the interchange (101) may use the account information (121) to fund the purchase.

In one embodiment, when the user of the mobile phone (116) approves the purchase, the user may choose to use the accounts identified by the account information (121) to provide the funds for the purchases, without revealing their account information (121) to the operators of the servers (113). Alternatively, the user may choose to provide the funds via the phone bill of the mobile phone (116) (e.g., prepaid, or monthly bill).

For example, the user of the mobile phone (117) may use the user terminal (111) to provide the phone number (122) to the servers (113) and/or the interchange (101) to make a purchase. The interchange (101) sends a message to the mobile phone (117) via the phone number (122) to confirm the purchase request. Once the purchase is confirmed via the corresponding mobile phone (117), the interchange (101) sends a message to the mobile phone (116) based on the association of the phone numbers (122 and 123) in the data storage facility. Once the purchase is approved via the corresponding mobile phone (116), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) does not have to provide the phone number (122) to the server (113) to process the payment. The server (113) may redirect a payment request to the interchange (101), which then prompts the user terminal (111) to provide the phone number (122) to the website of the interchange (101) to continue the payment process.

For example, the server (113) may redirect the payment request to the website of the interchange (101) with a reference indicating the purchase made via the user terminal (111). The interchange (101) can use the reference to subsequently complete the payment with the server (113) for the purchase, after receiving the phone number (122) directly from the user terminal (111) to confirm the purchase via the mobile phone (117).

In some embodiments, instead of directly providing the phone number (122) to identify the account information (121), the user may provide other information to identify the phone number (122), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (116) via a secure connection.

Alternatively, the user of the mobile phone (116) may supply the account information (121) to the interchange (101) at the time of approving the payment request, after the purchase is confirmed via the mobile phone (117).

In one embodiment, once the account information (121) is associated with the phone number (123) in the data storage facility (107), the user does not have to resubmit the account information (121) in subsequent payment requests. The user of the mobile phone (116) may use a reference to the account information (121) to instruct the interchange (101) to use the account information (121) to collect the funds.

By delegating the payment task to the interchange (101) and securing the account information (121) in the data storage facility (107), the system as shown in FIG. 1 can increase the security of using the account information (121) in an online environment, while allowing the user of the mobile phone (116) to control and pay for the purchases made by others, such as the user of the mobile phone (117), without revealing the account information (121) to them.

In some embodiments, the interchange (101) can also fulfill the payment requests using the funds collected via the phone bill of the phone number (123). The interchange (101) can collect the funds via sending premium messages to the mobile phone (117) at the phone number (123), after receiving confirmation from the mobile phone (117).

For example, after the confirmation or approval message is received from the mobile phone (116), the interchange (101) performs operations to collect funds via the phone bill of the phone number (123). The interchange (101) may calculate the required premium messages to bill to the mobile phone (116). For example, mobile terminated premium SMS messages may have a predetermined set of prices for premium messages. The interchange (101) determines a combination of the premium messages that has a price closest to the amount required for the purchase, and sends this combination of premium messages to the mobile phone. For example, mobile originated premium SMS messages may also have a predetermined set of prices for premium messages. The interchange (101) can calculate the set of messages required for the purchase and transmit a text message to the mobile phone (116) of the user to instruct the user to send the required number of premium messages to provide the funds.

In one embodiment, the user of the mobile phone (116) can specify a set of restrictions that are applied to the purchase requests made by the users of the associated mobile phone (117). For example, the restrictions may include the allowable frequency of the purchases, the allowable types of purchases (e.g., the type of products or services purchased), the allowable spending limit for each purchase, a budget for a predetermined period of time (e.g., a month, a week, etc.), the allowable time period during a day for purchases, etc. Thus, a parent may use the restrictions to apply parental control of the purchase activities of a child. In one embodiment, the interchange (101) communicates with the mobile phone (117) for purchase confirmation, if the purchase satisfies the restrictions.

In one embodiment, the mobile phones (116 and 117) are used by the corresponding users to make payments and/or manage funds, such as for making purchases in various websites hosted on the servers (113) of merchants and service providers and/or for transfer funds to or from an account identified by the account information (121), such as phone bills of land-line telephone services, credit card accounts, debit card accounts, bank accounts, etc., or an account hosted on the data storage facility (107) or telecommunication accounts of the mobile phones (116 and 117) with telecommunication carriers. The mobile phones (116 and 117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone numbers (122 and 123)).

In one embodiment, the user of the mobile phone (116) may provide an advance approval for one or more anticipated purchases made by the users of the mobile phone (117). For example, the mobile phones (116 and 117) may be in different countries in different time zones; and the user of the mobile phone (116) may not be available to provide the approval when the user of the mobile (117) makes a purchase. Thus, the user of the mobile phone (116) may provide an advance approval with limitations, such as allowable amount/budget and expiration date, to avoid the delay in the approval of the purchases by the user of the mobile phone (117).

Figure 2:
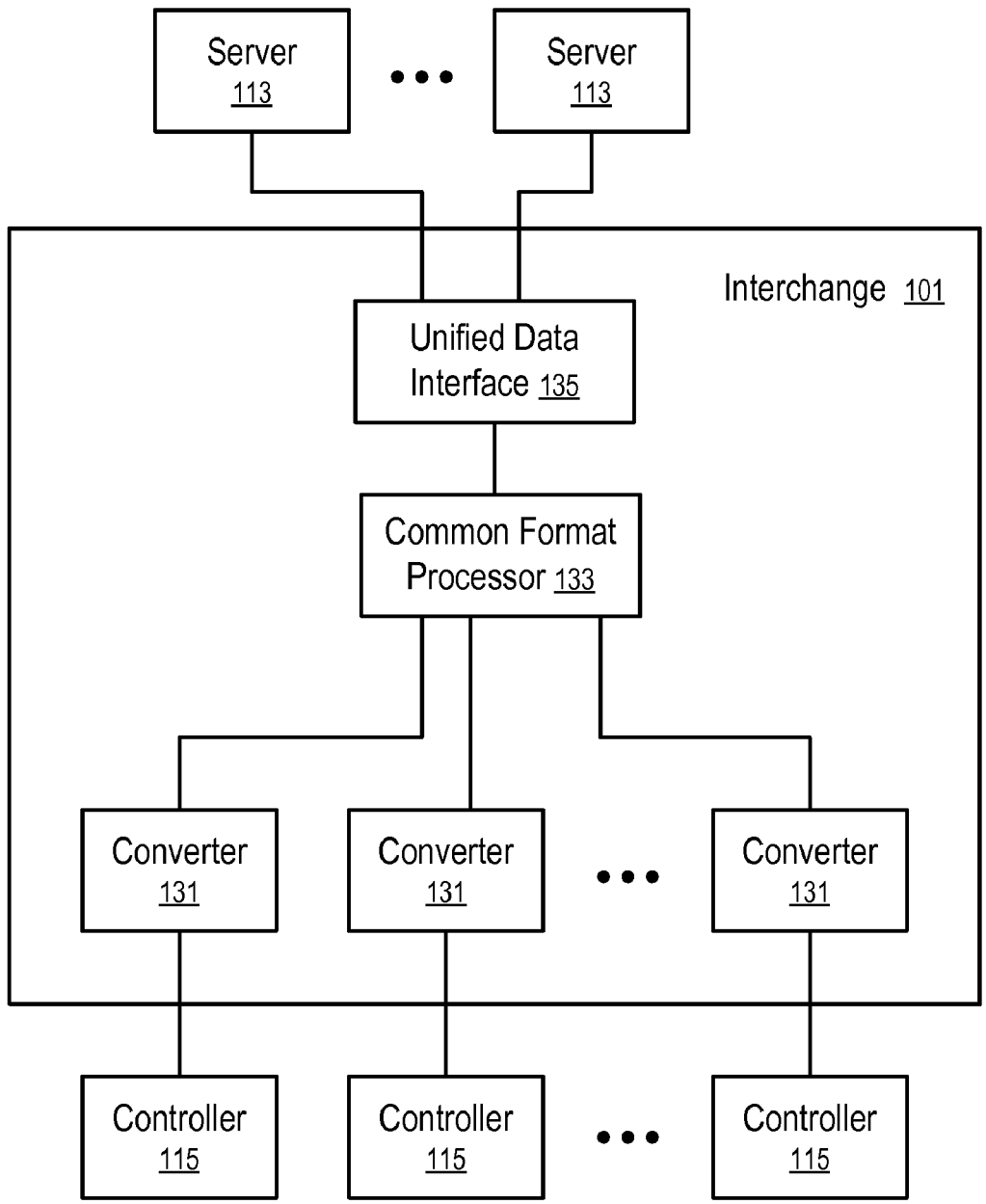
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
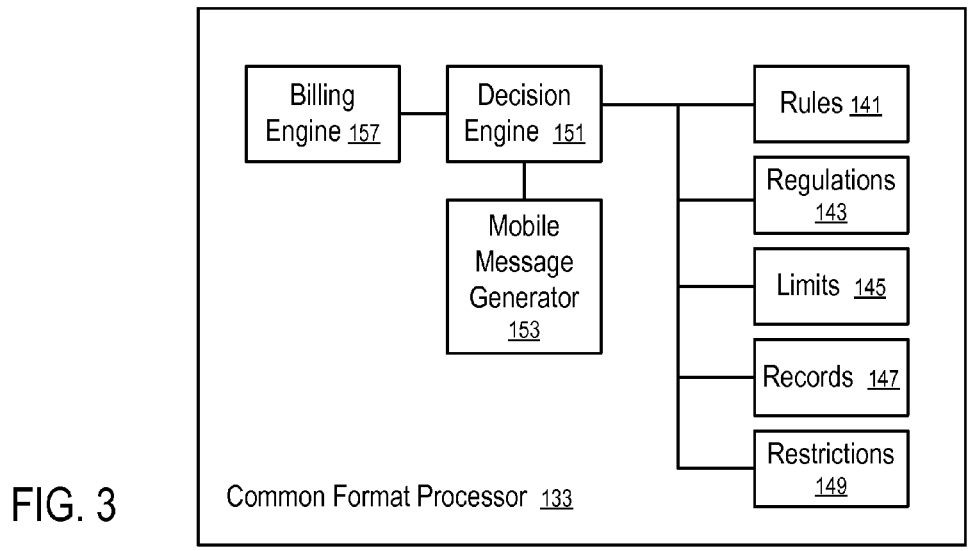
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (116) to bill the user, or requests the mobile phone (116) to send mobile originated premium SMS messages to a short code representing the interchange (101).

In one operator billing method, the interchange (101) directly sends a message to the mobile carrier of the mobile phone (116) to bill the amount on the phone bill of the mobile phone (116), without having to send a premium message to the mobile phone (116).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (116). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (116) about the transaction (e.g., a request to collect funds via the phone bill of the user for a payment request, or for deposit into an account identified by the account information (121)). The converter (131) then interfaces with the corresponding controller (115) to transmit the messages to the mobile phone (116).

FIGS. 4-7 show methods to control an online transaction using an interchange according to a plurality of embodiments.

Figure 4:
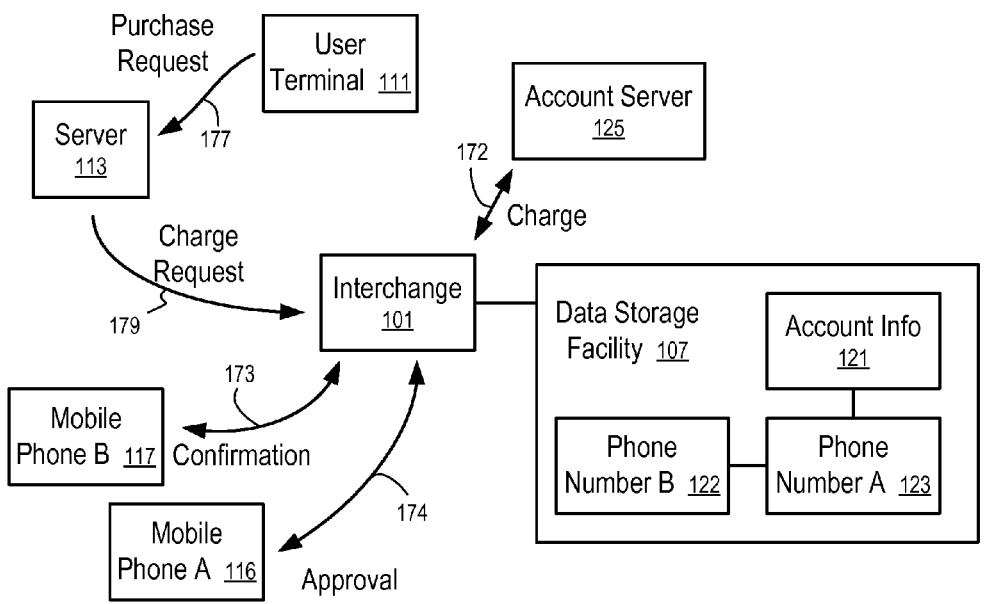
FIGS. 4-7 show methods to control an online transaction using an interchange according to a plurality of embodiments.

In FIG. 4, the user of the mobile phone (116) at the phone number (123) may provide account information (121) to the interchange (101) for association with the phone number (123). For example, the user may use a device running a web browser as the user terminal (111) to submit the account information (121) via a secure web connection. The user terminal (111) is typically different from the mobile phone (116). However, in some embodiments, the mobile phone (116) may also be used as the user terminal (111) to submit the account information (121) (e.g., via a wireless application protocol (WAP) application, or via a message sent via short message service (SMS) or multimedia message service (MMS), or via an email message or an instant message).

After the user of the mobile phone (116) provides the account information (121) to the interchange (101) for storage in the data storage facility (107), the user of the associated mobile phone (117) can send (177) a purchase request to the server (113) of a merchant from the user terminal (111). The users of the mobile phones (116 and 117) may use the same user terminal (111) or different user terminals.

In response to a purchase request from the user terminal (111), the server (113) of the merchant can send or redirect (179) the charge request to the interchange (101). In response to the charge request, the interchange (101) sends (173) a confirmation message to the mobile phone (117). If the user of the mobile phone (117) sends (173) a confirmation to the interchange (101), the interchange sends (174) a message to the mobile phone (116) for approval, since the data stored in the data storage facility (107) indicates that the purchases made by the user of the mobile phone (117) at the phone number (122) is to be funded by the user of the mobile phone (116) at the phone number (123). If the user of the mobile phone (116) approves the request, the interchange (101) communicates with the account server (125) to charge an account identified by the account information (121), without revealing the account information (121) to the server (113). The interchange (101) pays the merchant on behalf of the user using the funds collected via charging the account of the user of the mobile phone (116). For example, the interchange (101) may use its own bank account to pay the merchant operating the server (113). Thus, the financial information of the user is not revealed to the merchant.

Upon the completion of the payment process, the interchange (101) can notify the mobile phone (117), the mobile phone (116) and/or the user terminal (111).

In some embodiments, the server (113) of the merchant redirects the charge request to allow the user terminal (111) to communicate with the interchange (101) to continue the payment process; and the user terminal (111) may provide (171) the phone number (122), or both the phone numbers (122 and 123), directly to the interchange (101) to request the interchange (101) to process the payment for the transaction, after the charge request is redirected.

In alternative embodiments, the user of the mobile phone (116) may provide the account information (121) from the mobile phone (116) together with the approval of the purchase request.

In one embodiment, the interchange (101) communicates with the mobile phone (117) for the confirmation of the charge request via SMS messages. Alternatively, the confirmation communications can be sent (173) via emails, instant messages, voice message, live calls from operators, etc.

In one embodiment, the interchange (101) communicates with the mobile phone (116) for the approval of the charge request via SMS messages. Alternatively, the approval communications can be sent (173) via emails, instant messages, voice message, live calls from operators, etc.

In some embodiments, the confirmation communications may include only a one-way message from the interchange (101) to the mobile phone (117) or from the mobile phone (117) to the interchange (101). For example, the interchange (101) may provide a code (e.g., a one time code with an expiration time limit) to the mobile phone (117) and the user may be required to provide the code back to the interchange (101) via the user terminal (111) to confirm the request. For example, the interchange (101) may provide the code to the user terminal (111) to request the code back from the mobile phone (117) to confirm the request.

Similarly, the approval communications may include only a one-way message from the interchange (101) to the mobile phone (116) or from the mobile phone (116) to the interchange (101). For example, the interchange (101) may provide a code (e.g., a one time code with an expiration time limit) to the mobile phone (116) and the user may be required to provide the code back to the interchange (101) via the user terminal (111) to confirm the request. For example, the interchange (101) may provide the code to the user terminal (111) to request the code back from the mobile phone (116) to confirm the request.

In some embodiments, the interchange may provide the code representing the transaction to the mobile phone (117) and request the code back from the mobile phone (116) to confirm and approve the transaction. In some embodiments, the interchange may provide the code representing the transaction to the mobile phone (116) and request the code back from the mobile phone (117) to confirm and approve the transaction. The users of the mobile phones (117 and 116) may communicate with each other via any communication links to allow the code be reported back to the interchange (101). For example, the users of the mobile phones (116 and 117) may forward the code via SMS, emails, instant messages, voice message, or live calls, etc.

Figure 5:
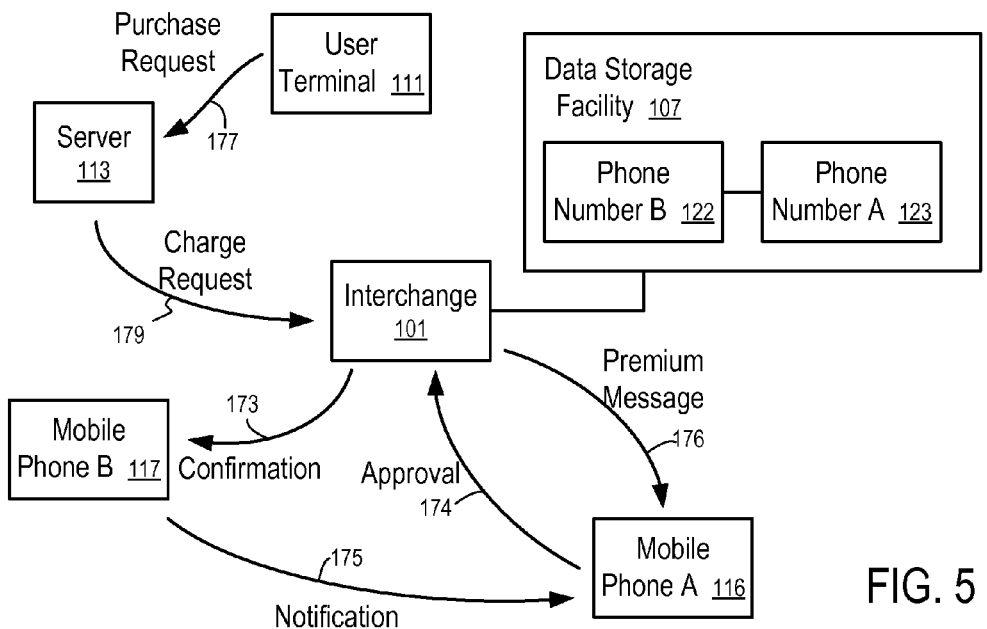

In some embodiments, the user of the mobile phone (117) may choose to fulfill the charge request via the phone bill, instead of charging the account identified by the account information (121), as illustrated in FIG. 5.

In FIG. 5, after the interchange (101) sends (173) a confirmation code to the mobile phone (117), the user of the mobile phone (117) provides (175) the code to the mobile phone (116) via a notification message (e.g., via SMS, emails, instant messages, voice message, live calls, etc.). The user of the mobile phone (116) then provides (174) the confirmation code to the interchange (101) to approve the transaction.

In FIG. 5, after receiving the approval from the mobile phone (116), the interchange (174) sends (176) a set of premium messages to the mobile phone (116) to collect funds via the telecommunications carrier of the mobile phone (116).

Figure 6:
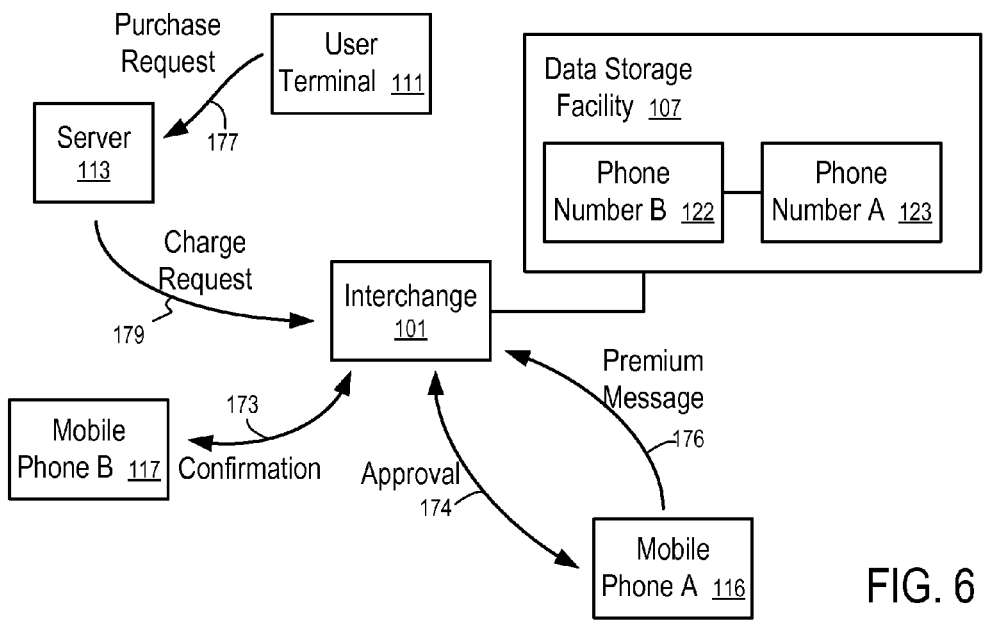

Alternatively, the interchange (101) may request the mobile phone (116) to send (176) a set of premium messages from the mobile phone (176) to collect the funds for the purchase request, as illustrated in FIG. 6. In some embodiments, the set of premium messages includes the approval message sent from the mobile phone (116) to the interchange (101). In FIG. 6, the interchange (101) separately communicates with the mobile phone (117) of the purchaser and the mobile phone (116) of the approver/payer for confirmation and for approval.

In some embodiments, the interchange (101) obtains the approval from the mobile phone (116) of the approver/payer prior to obtaining confirmation from the mobile phone (117) of the purchaser. In some embodiments, the interchange (101) obtains the confirmation from the mobile phone (117) of the purchaser prior to obtaining the approval from the mobile phone (116) of the approver/payer. In other embodiments, the interchange (101) sends (173 and 174) messages to both the mobile phones (116 and 117) prior to receiving replies from any of the mobile phones (116 and 117).

Figure 7:
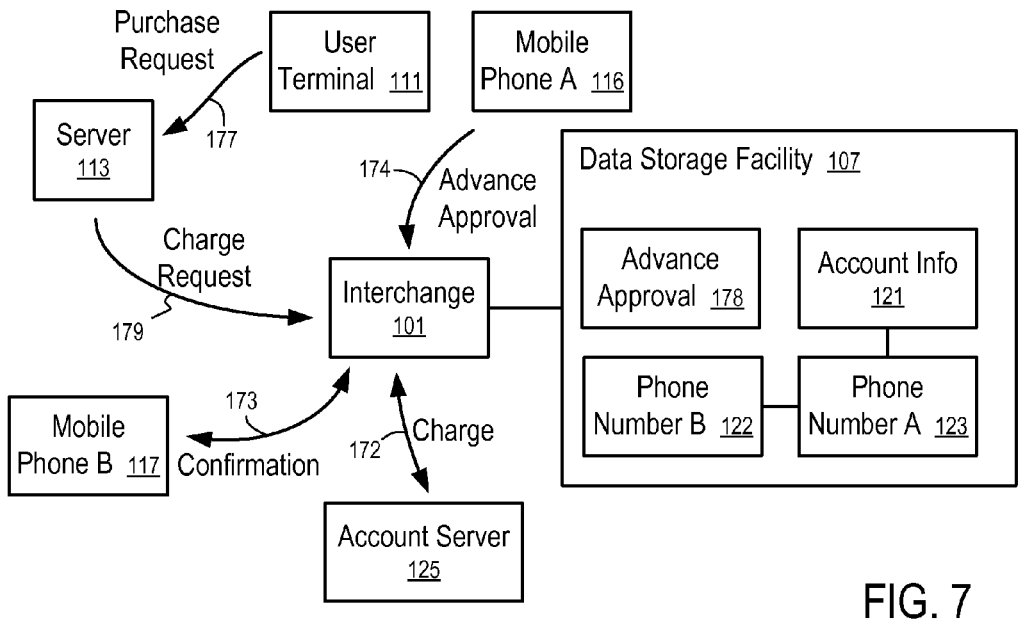

FIG. 7 illustrates an example of an advanced approval from the mobile phone (116) of the approver/payer. After the mobile phone (116) sends (174) an advance approval to the interchange (101), the data storage facility (107) stores data indicating the advance approval (178), which may include a budget limit, an expiration date, and a reference to the phone number (122) associated with the phone number (123) of the mobile phone (116). When the charge request (179) is received (179) from the server (113) of the merchant (or from the user terminal (111)), the interchange (101) communicates (173) with the mobile phone (117) to confirm the request, if the request meets the limitations of the advance approval (178).

FIGS. 8-11 show interfaces to obtain information of related telephone numbers according to a plurality of embodiments.

Figure 8:
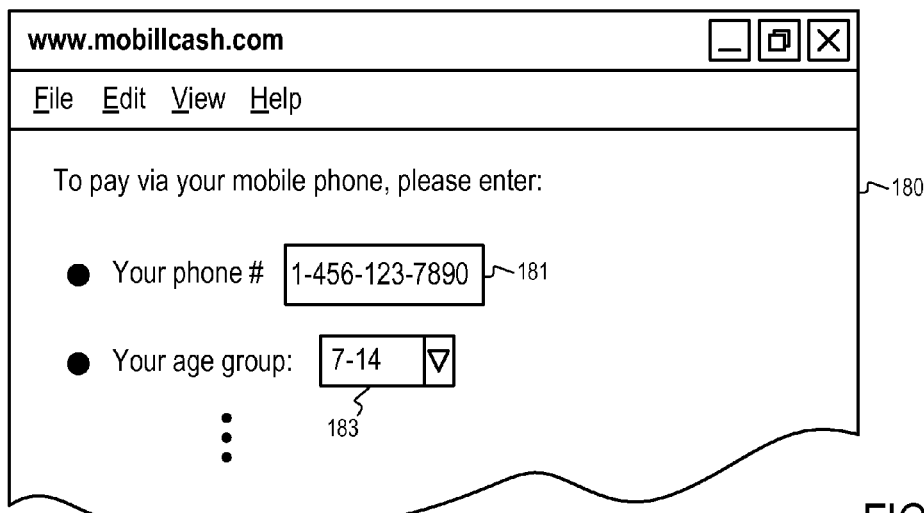
FIGS. 8-11 show interfaces to obtain information of related telephone numbers according to a plurality of embodiments.
Figure 9:
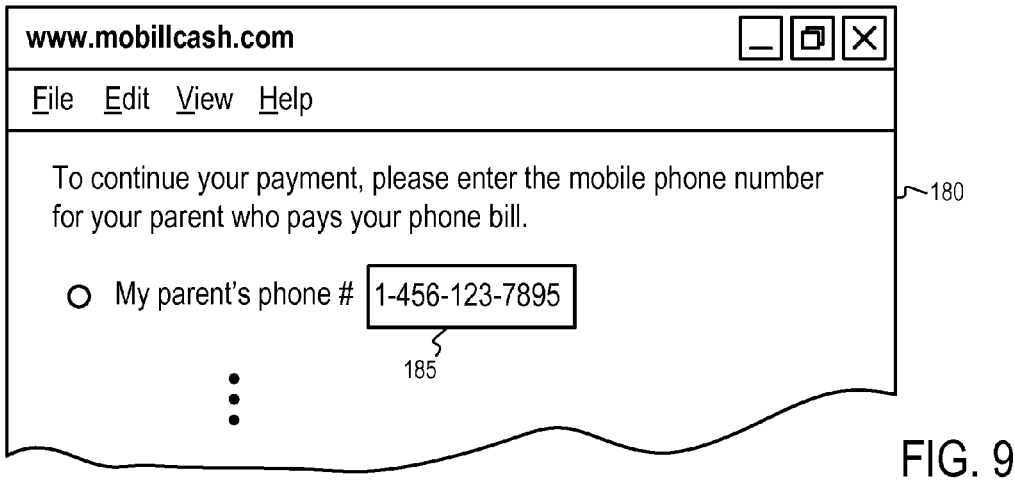

In FIG. 8, the user interface (180) (e.g., presented on the user terminal (111) or the mobile phone (117)) prompts the user to provide the phone number (122) in the input box (181) and to provide an indication of the age of the user in the selection box (183). If it is determined that the user is a child under an age limit, the user interface illustrated in FIG. 9 is presented to require the user to provide the phone number (123) of the parent in the entry box (185). Once the child user provides the phone number (123) of the parent, the data storage facility (107) stores data to associate the phone number (122) of the child with the phone number (123) of the parent and an indication that the funds for the purchases made by the child come from the parent at the phone number (123).

In one embodiment, the server (113) presents the user interface (180) via an online shopping cart system or a third party checkout system. Alternatively or in combination, the server (113) presents the user interface (180) via a web widget. For example, a web widget may include a program code that is portable and executable within a web page without requiring additional compilation. The web widget allows the user to interact with the user interface (180) to pay for the product and/or service without leaving the web page or refreshing the web page. In one embodiment, the interchange (101) provides the web widget to facilitate the payment processing.

Figure 10:
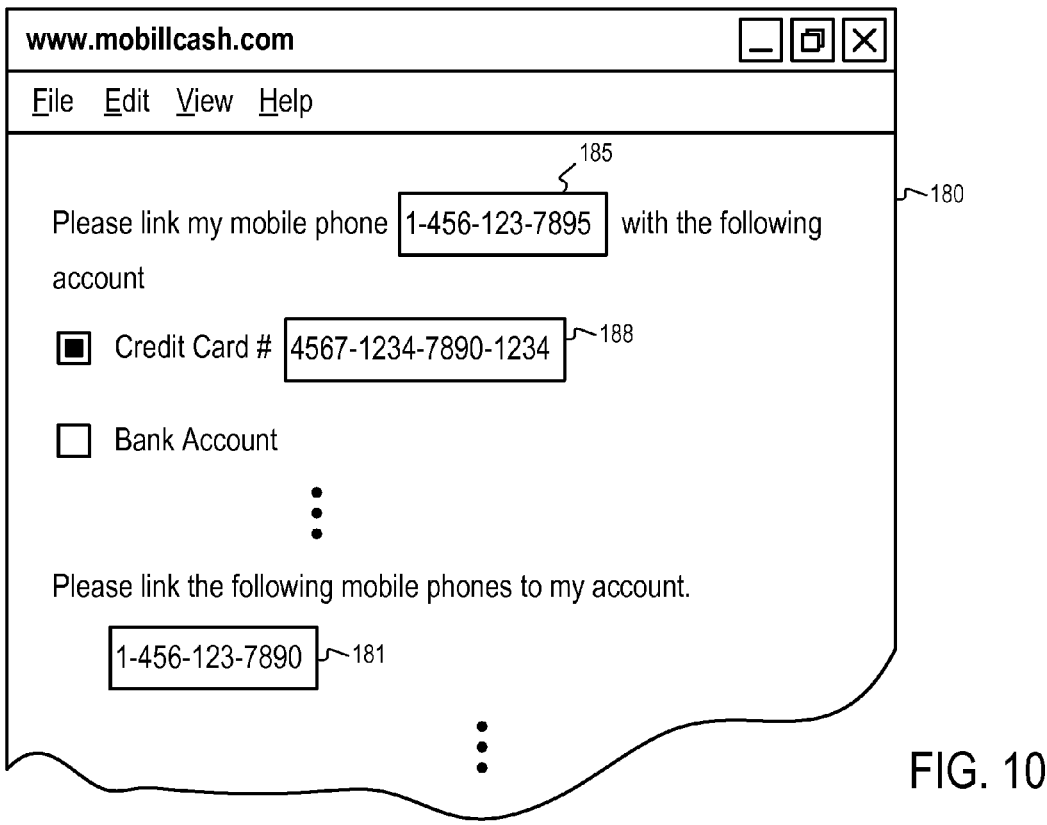

In FIG. 10, when the user of the mobile phone (116) provides the phone number (123) in the entry box (185) to associate the phone number (123) with the account information (121) provided within the entry box (188), the user interface (180) allows the user to link the phone number (123) with one or more phone numbers specified in the input box (181). If the user links the phone numbers (122 and 123) via the user interface (180) illustrated in FIG. 9, the data storage facility (107) allows the user of the mobile phone (117) at the phone number (122) to fund purchases using the account information (121) provided via the entry box (188). The interchange (101) is then configured to communicate with the mobile phone (116) at the phone number (123) provided in the entry box (185) for approval of the purchases made by the user of the associated mobile phone (117).

FIG. 10 illustrates the example of specifying a credit card number in the entry box (188) as the account information (121). Alternatively or in combination, the user interface (180) may allow the user to specify one or more of various other types of accounts, such as bank accounts, charge card accounts, etc.

In some embodiments, the user interface (180) may further present a text field (not shown in FIG. 10) to allow the user to specify an alias for the account information (121) supplied in the text input field (181). For enhanced security, the alias can be used for subsequent communications with the user to select one account from a plurality of accounts without revealing the account information (121).

In FIG. 10, the user interface (180) may be presented via a web browser (or a custom application) to submit account information (121) from a user terminal (111) to the interchange (101). Alternatively, the account number can be submitted from the mobile phone (116) via a message sent via SMS, WAP, voice mail, or via an interactive voice response (IVR) system.

Figure 11:
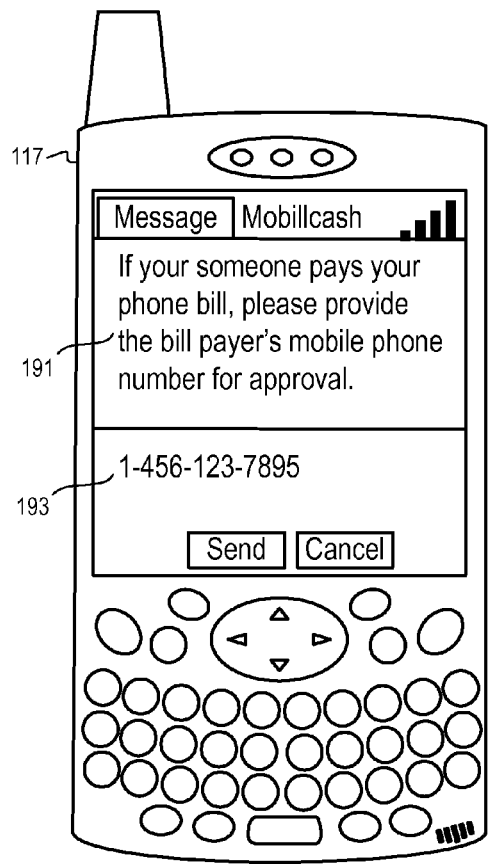

FIG. 11 illustrates the mobile phone (117) of a child prompting the child to provide a phone number of the parent of the child. For example, after the child initiates a purchase request with the phone number (122) of the mobile phone (117) operated by the child, the interchange (101) may prompt the child to provide the phone number (123) of the parent. After the child provides the phone number (123) of the parent, the interchange (101) can communicate with the mobile phone (117) of the parent for approval and billing.

In some embodiments, the mobile phone (117) of the child is used to prompt for the phone number of the parent, when the child registers with the interchange (101). The interchange (101) provides the message to the mobile phone (117) to confirm that the user is in possession of the mobile phone (117) at the phone number (122) and to prompt the user for the phone number of the person who pays the phone bill of the mobile phone (117).

In some embodiments, a user of the mobile phone (117) may also request the interchange (101) to link the phone number (122) with the phone number (123) of a family member, a relative, or a friend who is willing to fund some purchases made by the user. Thus, the relationship between the users of the mobile phones (116 and 117) is not limited to the child and parent relationship.

Figure 12:
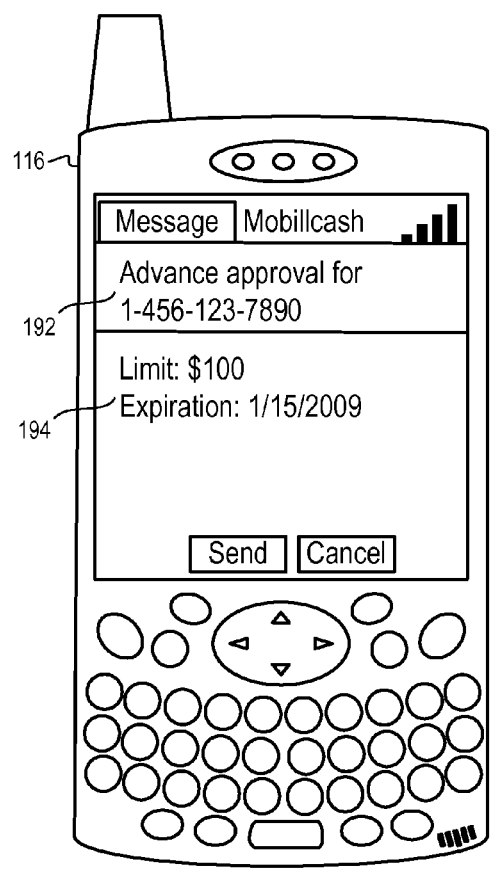
FIG. 12 illustrates a user interface to provide advance approval according to one embodiment.

FIG. 12 illustrates a user interface to provide advance approval according to one embodiment. In FIG. 12, the user of the mobile phone (116) provides a message (194) to approve one or more future purchases requests initiated by the user of the mobile phone (117).

In one embodiment, the advance approval is in response to a request from the mobile phone (117). The interchange (101) sends a message (192) to the mobile phone (116), in response to the request for advance approval from the mobile phone (117). The message (192) identifies the phone number (122) of the mobile phone (117); and the advance approval message (194) includes restrictions, such as a budget limit, an expiration limit of the advance approval, etc. Other restrictions may include the location and time of the purchase, the type of products and services to be purchased, the maximum number of purchase requests, the frequency of purchase requests, etc.

In some embodiments, the user of the mobile phone (116) at the phone number (123) may directly send a message to interchange (101) provide the advance approval for the phone number (122), without a corresponding incoming message from the interchange (101). For example, the users of the mobile phones (116 and 117) may communicate with each other to identify the need for the advance approval, prior to the user of the mobile phone (116) sending the advance approval to the interchange (101).

Figure 13:
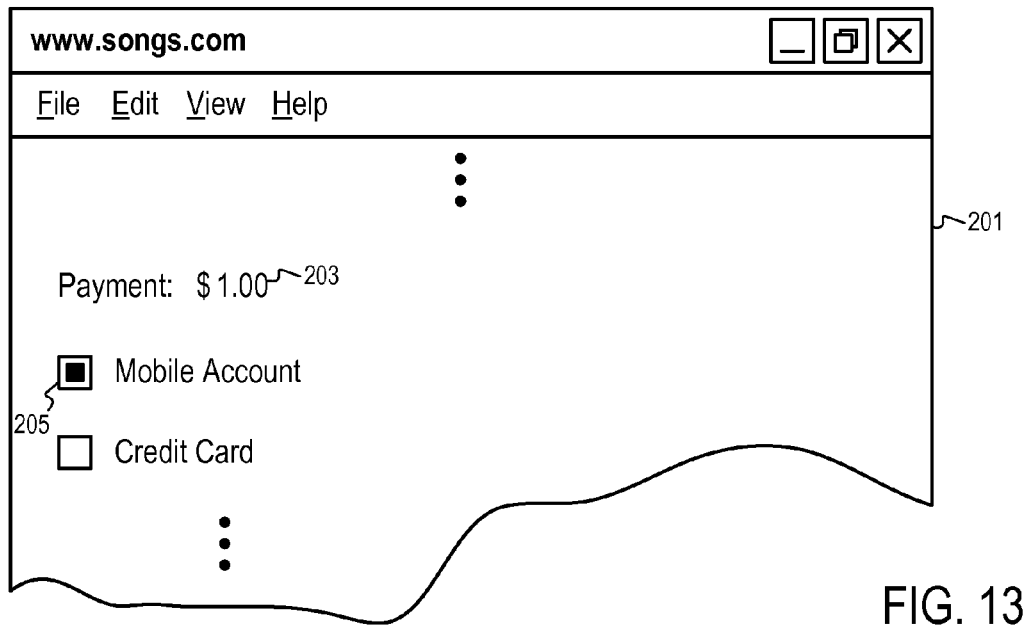
FIG. 13 illustrates a user interface to initiate a payment transaction according to one embodiment.

FIG. 13 illustrates a user interface to initiate a payment transaction according to one embodiment. In FIG. 13, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the website of the interchange (101) to complete the payment.

Figure 14:
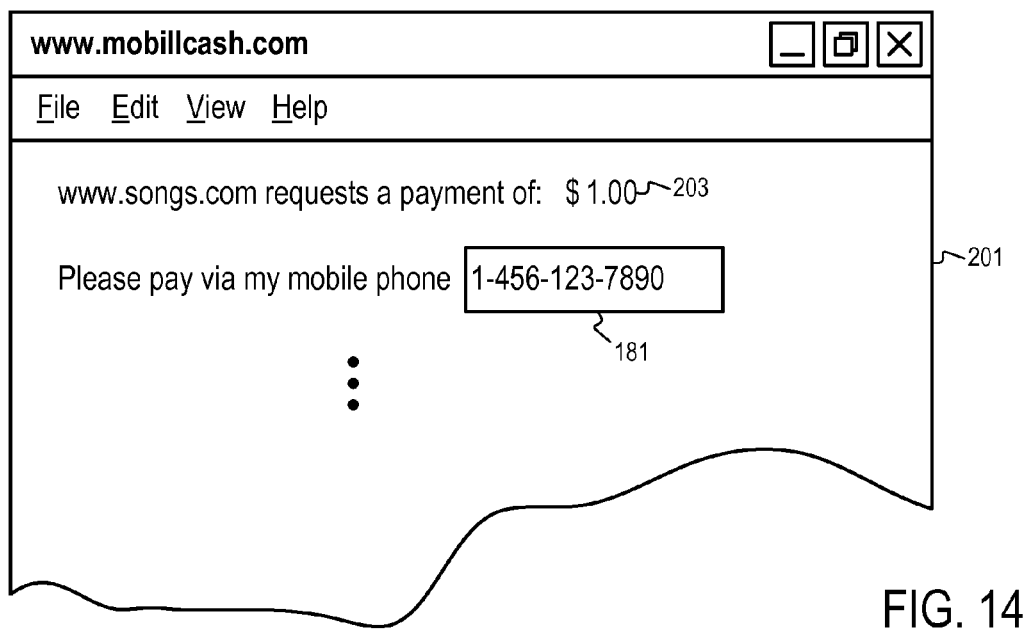
FIG. 14 illustrates a user interface to initiate a payment request according to one embodiment.

FIG. 14 illustrates a user interface to initiate a payment request according to one embodiment, after the payment request is redirected to the website of the interchange (101). In FIG. 14, the user interface (201) includes the identity of the merchant and the amount (203) of the requested payment. The user interface (201) includes a text field (181) to allow the user to provide the phone number (122) of the mobile phone (117) to confirm the purchase request.

Further, user authentication may be used to reduce false messages to the phone number (122). For example, the user interface (201) may request a personal identification number (PIN) for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (122) to initiate the payment transaction. In some embodiments, the user interface (201) requires the user to provide no information other than the phone number (122) in the text field (181) to initiate the transaction. In some embodiments, the user interface (201) provides a list of options for the user at the phone number (122) to fund the purchases, such as credit cards or bank accounts associated with the phone number (122), or accounts associated with the phone number (123).

In some embodiments, the user interface (201) may present the payment options after authenticating the user (e.g., via a personal identification number or password) for enhanced security.

In one embodiment, once the user submits the payment request via the user interface (201), the interchange (101) transmits a confirmation message to the mobile phone (112) according to the phone number (122) provided in the text field (181). In one embodiment, the interchange (101) transmits the confirmation to the mobile phone (116) after the user is authenticated via the user interface (201) to reduce the possibility of unauthorized/unwelcome messages to the mobile phone (116), which may occur when the user intentionally or unintentionally provides an unrelated phone number in the entry box (181).

Figure 15:
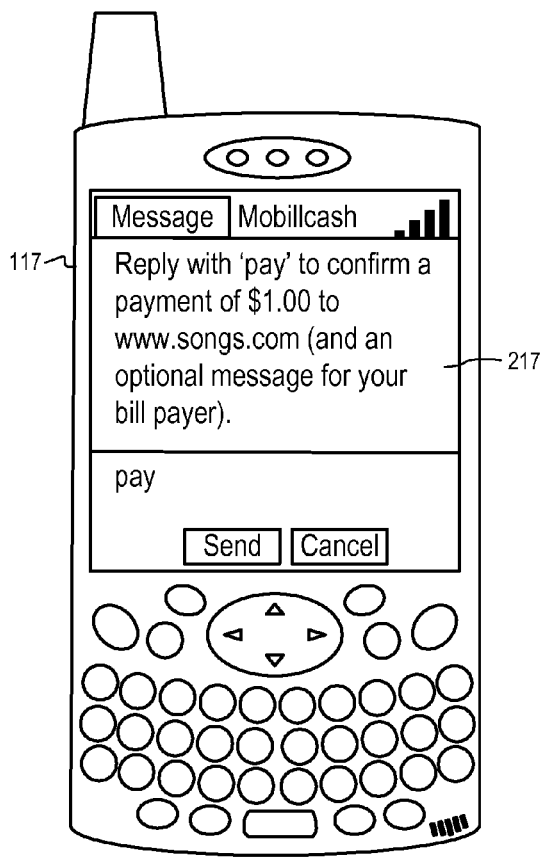
FIG. 15 illustrates a user interface to confirm a payment request according to one embodiment.

FIG. 15 illustrates a user interface to confirm a payment request according to one embodiment. In FIG. 15, the confirmation message (217) from the interchange (101) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 15.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the phone number (122), and/or a code (not shown) randomly generated and presented in the user interface used to initiate the payment transaction (e.g., user interface (201)).

In some embodiments, the code requested in the text message (217) may be a personal identification number (PIN) associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 14). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

In one embodiment, the user of the mobile phone (117) may optionally provide a message with the code to the interchange (101). The interchange (101) then relays the message to the mobile phone (116) to assist the approval decision making at the mobile phone (116).

Figure 16:
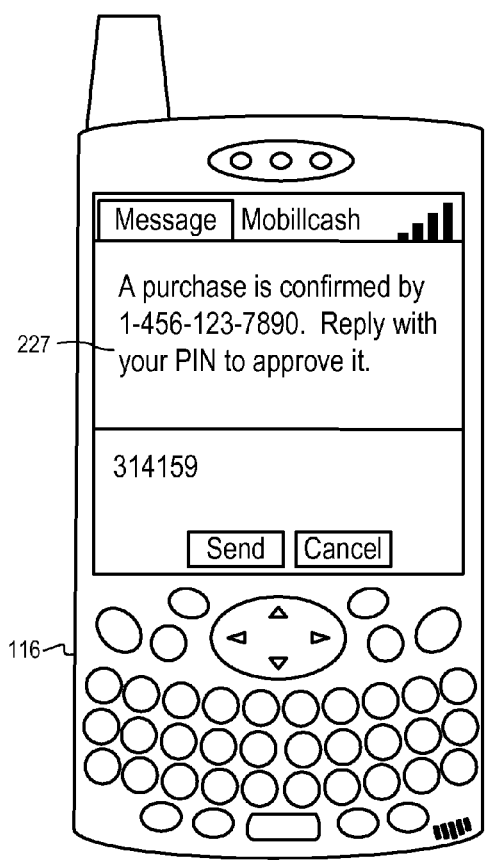
FIG. 16 illustrates a user interface to approve a confirmed payment request according to one embodiment.

FIG. 16 illustrates a user interface to approve a confirmed payment request according to one embodiment. In one embodiment, the interchange (101) sends a message (227) to the mobile phone (116) at the phone number (123), based on the association relationship between the phone numbers (122 and 123). The message (227) requests approval of a purchase made by the user of the mobile phone (117). The interchange (101) confirms the identity of the purchaser via the communications with the mobile phone (117), as illustrated in FIG. 15.

In FIG. 16, the approval request message (227) requests a code, such as a PIN associated with the phone number (123). Alternatively or in combination, the approval request (227) may include a code provided in the message (227) and/or the code provided to the user of the mobile phone (117) for the purchase transaction.

In one embodiment, if the user of the mobile phone (117) provides the optional message in the confirmation reply to the interchange (101), the approval request message (227) also includes a copy of the optional message to assist the user of the mobile phone (116) in deciding whether or not to approve the purchase.

In some embodiments, the user of the mobile phone (116) may optionally provide the account information (121) to provide the funds for the purchase.

In one embodiment, after the purchase is confirmed and approved via the communications with the mobile phones (117 and 116), the interchange (101) communicates with the account server (125) to electronically charge the user of the mobile phone (116) using the associated account information (121) and pays the payee using the funds collected via communicating with the account server (125). Alternatively, the interchange (101) may send premium messages to the mobile phone (116) to collect the funds via the telecommunication carrier of the mobile phone (116), request premium messages from the mobile phone (116), or communicate with the telecommunication carrier of the mobile phone (116) to collect the funds via the phone bill of the mobile phone (116).

In some embodiments, the interchange (101) notifies the users when the payment transaction is complete.

For example, the interchange (101) may notify the user of the mobile phone (117) and/or the user of the mobile phone (116) via a text message. Once the payment transaction is complete, the user would have access to the product purchased via the payment transaction.

In one embodiment, the interchange (101) stores an address of the user associated with the phone number (122). After the completion of the payment transaction, the interchange (101) provides the address to the server (113) of the merchant for the delivery of the purchased product. In some embodiments, the user of the mobile phone (117) may provide multiple addresses associated with the phone number (122) and may select one as a delivery address in the confirmation message to the interchange (101). Alternatively, the interchange (101) may receive an address for product delivery from the mobile phone (117) together with the confirmation message and then forward the address to the server (113) of the merchant. Thus, the shipping address of the transaction is verified to be associated with the mobile phone (117). In alternative embodiment, the user may directly provide the shipping address in the website hosted on the server (113) of the merchant.

In some embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 17:
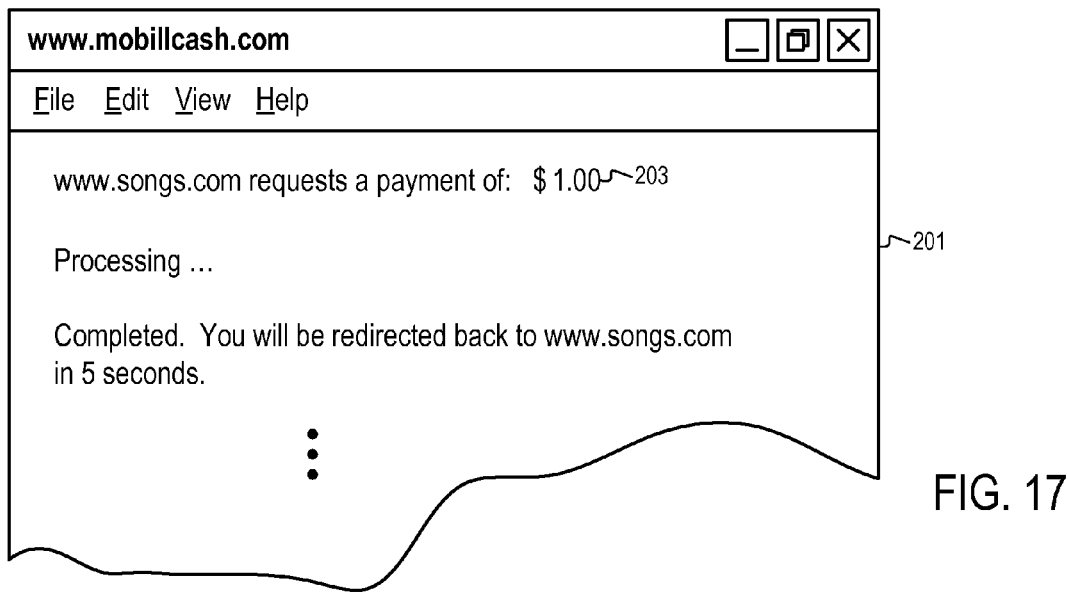
FIG. 17 illustrates a way to redirect a payment confirmation according to one embodiment.

FIG. 17 illustrates a way to redirect a payment confirmation according to one embodiment. For example, after the user submits the payment request to the interchange (101) via the user interface (201) shown in FIG. 14 (or FIG. 9), the interchange (101) may present the user interface (201) illustrated in FIG. 17 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the confirmation and approval from the users are required within a predetermined period of time of the request. If the user fails to provide the confirmation from the mobile phone (117), or the approval from the mobile phone (116), within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 18:
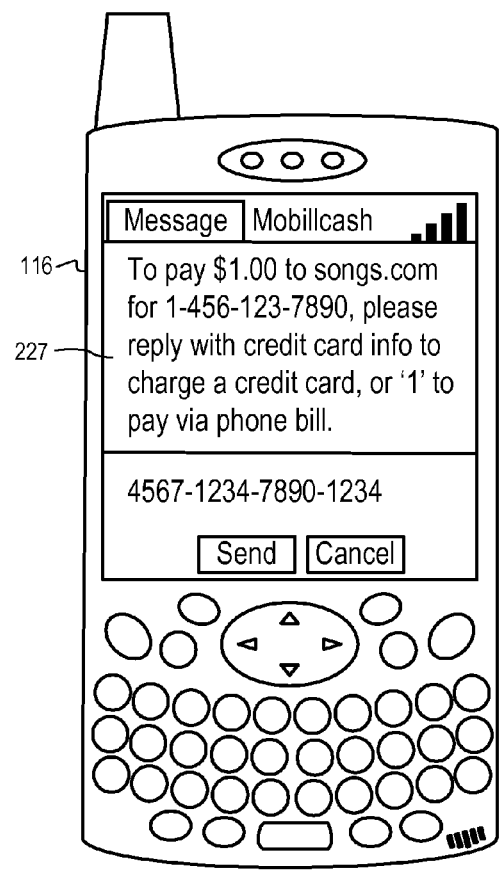
FIG. 18 illustrates a user interface to receive payment options according to one embodiment.

FIG. 18 illustrates a user interface to receive payment options according to one embodiment. In FIG. 18, the interchange (101) sends a message (227) to the mobile device (116) to provide a number of options to the user. The message (227) identifies the amount (203) of the requested payment and the identity of the payee (e.g., a merchant operating the server (113)) and asks the user to approve the payment request via a reply that contains a selected payment option.

In FIG. 18, the user may reply with the code "1" to approve the payment request and to pay via the phone bill of the mobile device (116). Alternatively, the user may reply with the credit card information to charge the payment to a credit card, as illustrated in FIG. 18.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.). Thus, each of the accounts can be identified to the user via the account type in the confirmation message, without revealing the details of the account information.

For example, the interchange (101) may combine the name of the financial institutions and the type of accounts to generate aliases for the account information.

In some embodiments, the user may define the aliases for the account information by supplying the aliases with the account information (121) for association with the phone number (123).

Figure 19:
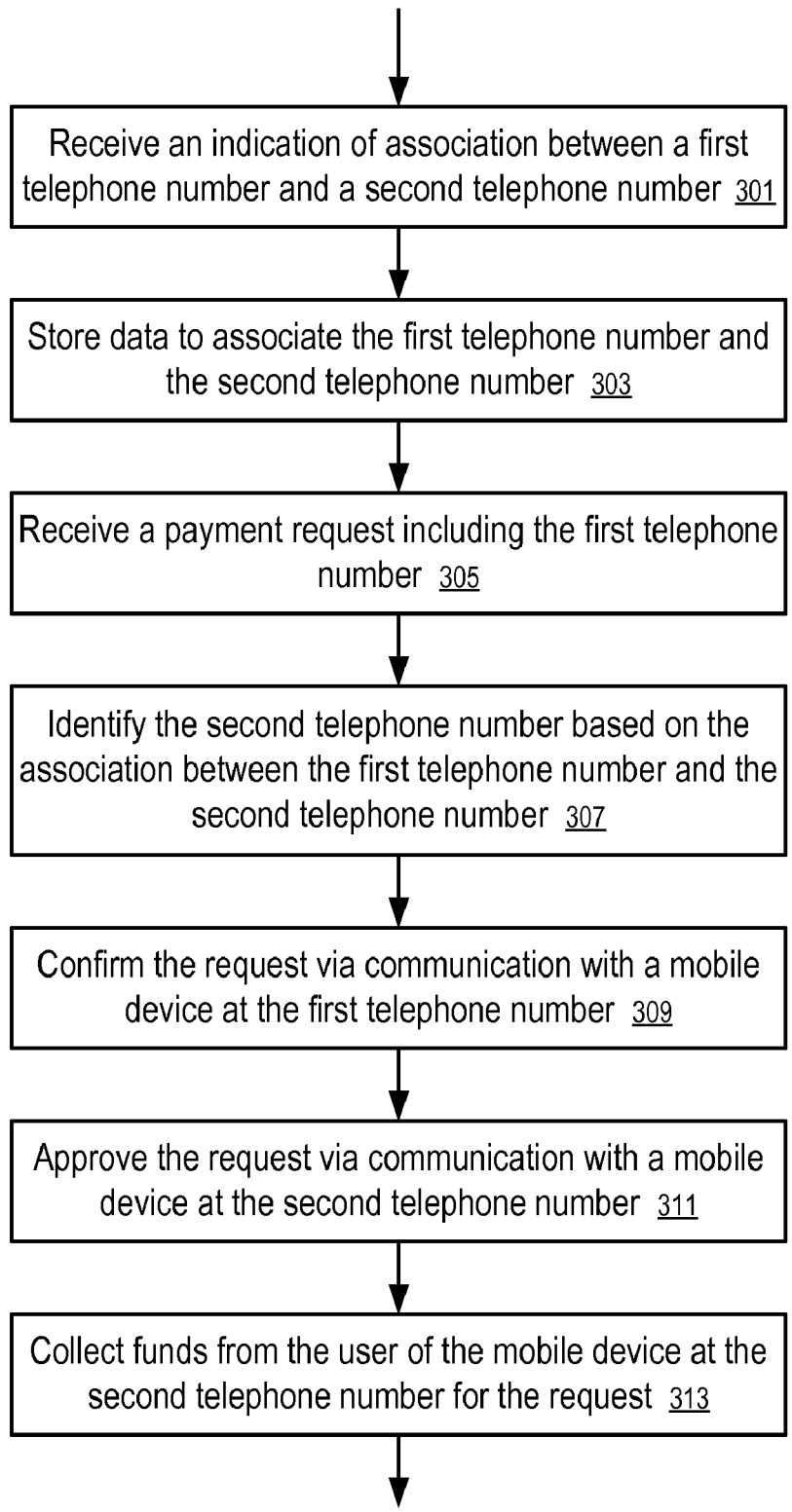
FIG. 19 shows a method to control an online payment according to one embodiment.

FIG. 19 shows a method to control an online payment according to one embodiment. In FIG. 19, the interchange (101) receives (301) an indication of association between a first telephone number and a second telephone number. The interchange (101) stores (303) data in the data storage facility (107) to associate the first telephone number and the second telephone number.

After the interchange (101) receives (305) a payment request including the first telephone number, the interchange (101) identifies (307) the second telephone number based on the association between the first telephone number and the second telephone number. The interchange (101) communicates with a mobile device at the first telephone number to confirm (309) the request and communicates with a mobile device at the second telephone number to approve (311) the request.

After the confirmation and approval of the purchase, the interchange (101) collects funds from the user of the mobile device at the second telephone number for the request.

Figure 20:
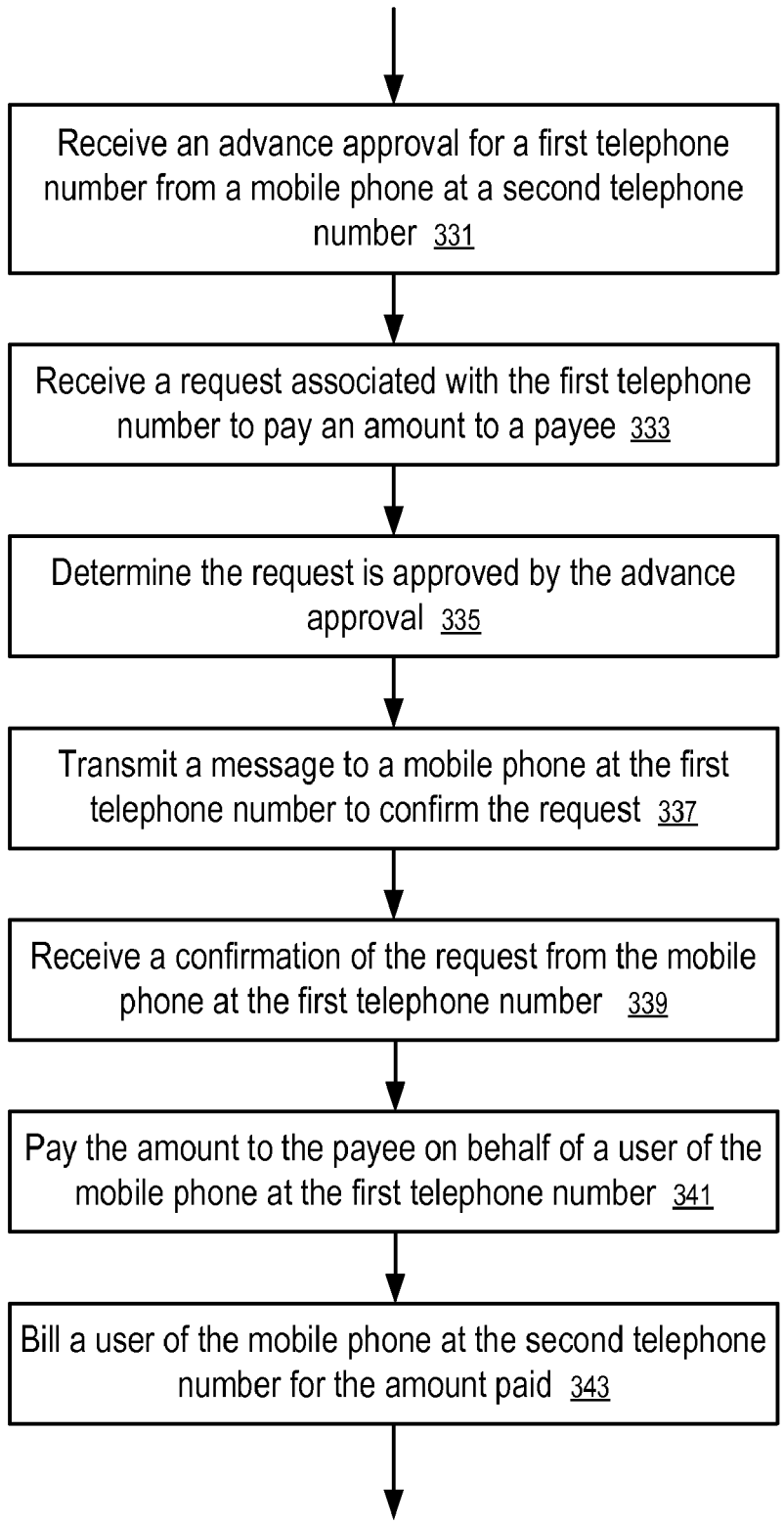
FIG. 20 shows another method to facilitate a payment transaction according to one embodiment.

FIG. 20 shows another method to facilitate a payment transaction according to one embodiment. In FIG. 20, the interchange (101) receives (331) an advance approval for a first telephone number from a mobile phone at a second telephone number. Subsequently, the interchange (101) receives (333) a request associated with the first telephone number to pay an amount to a payee. If the interchange (101) determines (335) the request is approved by the advance approval, the interchange (101) transmits (337) a message to a mobile phone at the first telephone number to confirm the request. If the interchange (101) receives (339) a confirmation of the request from the mobile phone at the first telephone number, the interchange (101) pays (341) the amount to the payee on behalf of a user of the mobile phone at the first telephone number and bills (343) a user of the mobile phone at the second telephone number for the amount paid.

In one embodiment, the interchange (101) bills the user of the mobile phone at the second telephone number for an amount equals to the purchase price plus a first fee and charges the merchant a second fee. In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., the fees charged by the telecommunication carrier for collecting the funds via the mobile phone bill associated with the telephone number and/or the fees charged by the interchange (101) for processing the payments). Since the first fee is charged to the customer (e.g., the payer of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

Figure 21:
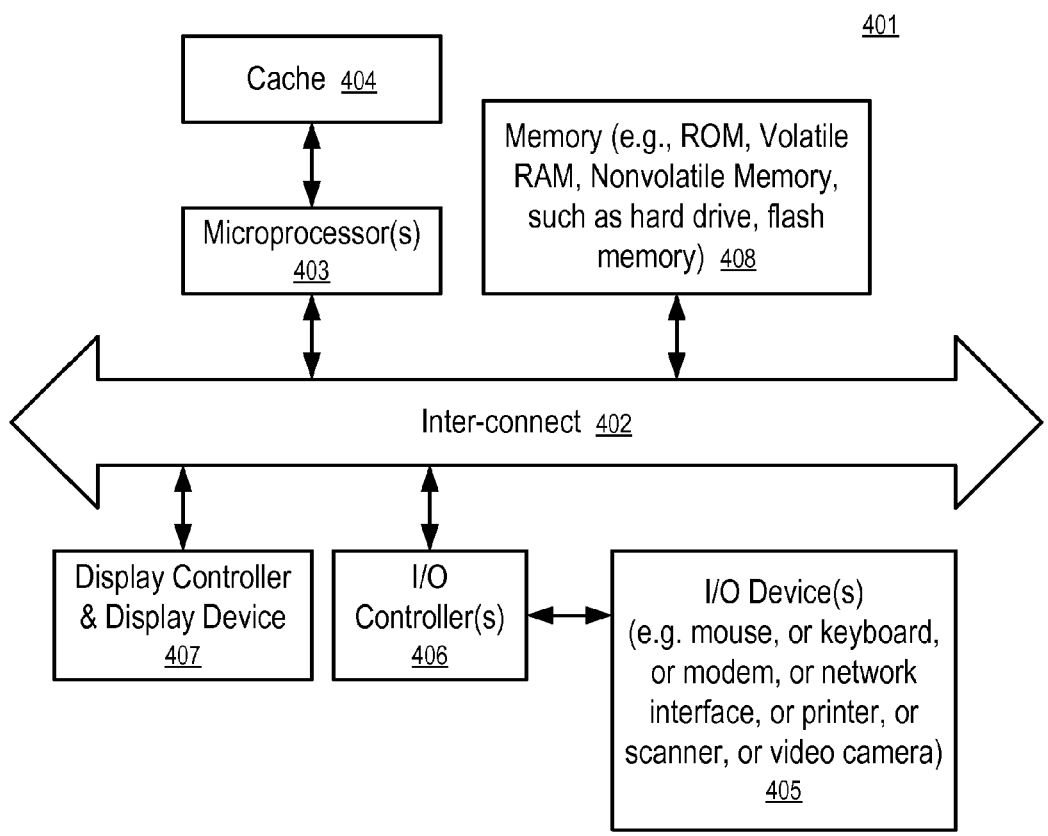
FIG. 21 shows a data processing system, which can be used in various embodiments.

FIG. 21 shows a data processing system, which can be used in various embodiments. While FIG. 21 illustrates various components of a computer system, it is not intended to represent any particular architecture or manner of interconnecting the components. Some embodiments may use other systems that have fewer or more components than those shown in FIG. 21.

In one embodiment, each of the interchange (101), the data storage facility (107), the controllers (115), the mobile phones (e.g., 116, 117), the user terminals (111), the account server (125) and the servers (113) can be implemented as a data processing system, with fewer or more components, as illustrated in FIG. 21. In one embodiment, the interchange (101) is a server computer system implemented using a data processing system illustrated in FIG. 21, without some of the components (e.g., a display device).

In FIG. 21, the data processing system (401) includes an inter-connect (402) (e.g., bus and system core logic), which interconnects a microprocessor(s) (403) and memory (408). The microprocessor (403) is coupled to cache memory (404) in the example of FIG. 21.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. The instructions may also be embodied in digital and analog communication links for electrical, optical, acoustical or other forms of propagated signals, such as carrier waves, infrared signals, digital signals, etc.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented on a data processing system, the method comprising:
   receiving a payment request at a server computer, the payment request including a first telephone number;
   communicating with a mobile phone at the first telephone number for confirmation of the payment request, prior to the communicating with a mobile phone at a second telephone number for approval of the payment request, wherein the communicating with the mobile phone at the first telephone number comprises receiving a confirmation message from the mobile phone at the first telephone number;
   identifying the second telephone number based on data stored in a database connected to the server computer, the data associating the first telephone number with the second telephone number;
   communicating with the mobile phone at the second telephone number for approval of the payment request, wherein the communicating with the mobile phone at the second telephone number comprises forwarding at least a portion of the confirmation message to the mobile phone at the second telephone number; and
   in response to the payment request being approved via the mobile phone at the second telephone number, processing the payment request using funds collected via the second telephone number, including collecting funds from an account associated with the second telephone number to process the payment response, after the payment request is approved via the mobile phone at the second telephone number.

2. The method of claim 1, further comprising:
   in response to the payment request being approved via the mobile phone at the second telephone number, transmitting at least one premium message to the mobile phone at the second telephone number to collect the funds.

3. The method of claim 1, further comprising:
   in response to the payment request being approved via the mobile phone at the second telephone number, identifying a financial account associated with the second telephone number; and
   electronically communicating with a financial institution to collect funds from the financial account.

4. The method of claim 1, wherein communicating with the mobile phone at the second telephone number comprises receiving an advance approval at the server computer from the mobile phone, prior to the receiving of the payment request, and the method further comprises:
   storing the advance approval in the database; and
   approving the payment request based on the advance approval stored in the database.

5. The method of claim 4, wherein the advance approval includes a budget limit, and the approving of the payment request is based at least in part on the payment request meeting the budget limit.

6. The method of claim 5, wherein the advance approval further includes an expiration limit, and the approving of the payment request is based at least in part on the payment request being received before the expiration limit.

7. The method of claim 1, further comprising:
   communicating with a telecommunication carrier to obtain the data associating the first telephone number with the second telephone number.

8. The method of claim 1, further comprising:
   presenting a web-based user interface to a user of the first telephone number to receive the first telephone number and an age of the user; and
   in response to the age of the user being under a predetermined threshold, prompting the user to provide the second telephone number of a guardian of the user.

9. The method of claim 1, further comprising:
   receiving an indication of association between the first telephone number and the second telephone number from a user of the mobile phone at the second telephone number.

10. The method of claim 9, further comprising:
    receiving an indication of association between the first telephone number and the second telephone number from a mobile phone at the first telephone number.

11. The method of claim 1, wherein the communicating with the mobile phone at the second telephone number for approval of the payment request comprises: transmitting an electronic message to the mobile phone; and
    receiving a reply to the electronic message from the mobile phone.

12. The method of claim 11, wherein the electronic message is transmitted to the mobile phone via short message service (SMS), and the reply is received from the mobile phone via short message service (SMS).

13. The method of claim 1, wherein a telecommunication carrier of the mobile phone at the first telephone number is in a first country, and the telecommunication carrier of the mobile phone at the second telephone number is in a second country different from the first country.

14. The method of claim 1, further comprising:
transmitting an electronic message to a mobile phone at the first telephone number,
the electronic message including a code identifying the payment request; and wherein the communicating with a mobile phone at the second telephone number for approval of the payment request comprises receiving the code from the mobile phone at the second telephone number.

15. The method of claim 1, further comprising:
receiving from a user of the mobile phone at the second telephone number at least one restriction on payment requests originated from the first telephone number; storing data indicating at least one restriction; and
determining whether the payment request received at the server computer is in compliance with the at least one restriction;
wherein the communicating with the mobile phone at the second telephone number for approval of the payment request is after a determination that the payment request received at the server computer is in compliance with the at least one restriction.

16. The method of claim 15, wherein the at least one restriction is based on at least one of: budget, time of payment requests, frequency of payment requests, and purchase category of payment requests.

17. A computer-readable storage media storing instructions, the instructions causing a server computer to perform a method, the method comprising:
receiving a payment request at a server computer, the payment request including a first telephone number;
communicating with a mobile phone at the first telephone number for confirmation of the payment request, prior to the communicating with a mobile phone at a second telephone number for approval of the payment request, wherein the communicating with the mobile phone at the first telephone number comprises receiving a confirmation message from the mobile phone at the first telephone number;
identifying the second telephone number based on data stored in a database connected to the server computer, the data associating the first telephone number with the second telephone number;
communicating with the mobile phone at the second telephone number for approval of the payment request, wherein the communicating with the mobile phone at the second telephone number comprises forwarding at least a portion of the confirmation message to the mobile phone at the second telephone number; and
in response to the payment request being approved via the mobile phone at the second telephone number, processing the payment request using funds collected via the second telephone number, including collecting funds from an account associated with the second telephone number to process the payment response, after the payment request is approved via the mobile phone at the second telephone number.

18. A system, comprising:
a data storage facility to store data associating a first telephone number with a second telephone number; and
an interchange coupled with the data storage facility, the interchange including a common format processor and a plurality of converters to interface with a plurality of controllers, the converters configured to communicate with the controllers in different formats, the converters to communicate with the common format processor in a common format, the common format processor to receive a payment request including the first telephone number, to communicate with a mobile phone at the first telephone number for confirmation of the payment request, prior to the communicating with a mobile phone at a second telephone number for approval of the payment request, wherein the communicating with the mobile phone at the first telephone number comprises receiving a confirmation message from the mobile phone at the first telephone number and to identify the second telephone number based on the data stored in the data storage facility associating the first telephone number and the second telephone number, the common format processor to instruct a first controller of the controllers, via a first converter of the converters, to communicate with the mobile phone at the second telephone number for approval of the payment request wherein the communicating with the mobile phone at the second telephone number comprises forwarding at least a portion of the confirmation message to the mobile phone at the second telephone number, wherein the system is to process the payment request using funds collected via the second telephone number, in response to the payment request being approved via the mobile phone at the second telephone number, including collecting funds from an account associated with the second telephone number to process the payment response, after the payment mobile phone at the second telephone number.

19. A method implemented on a data processing system, the method comprising:
receiving a payment request at a server computer, the payment request including a first telephone number;
communicating with a mobile phone at the first telephone number for confirmation of the payment request, prior to the communicating with a mobile phone at a second telephone number for approval of the payment request;
identifying the second telephone number based on data stored in a database connected to the server computer, the data associating the first telephone number with the second telephone number;
communicating with the mobile phone at the second telephone number for approval of the payment request; and
in response to the payment request being approved via the mobile phone at the second telephone number, processing the payment request using funds collected via the second telephone number, including collecting funds from an account associated with the second telephone number to process the payment response, after the payment request is approved via the mobile phone at the second telephone number, wherein a telecommunication carrier of the mobile phone at the first telephone number is in a first country, and the telecommunication carrier of the mobile phone at the second telephone number is in a second country different from the first country.

20. The method of claim 19, further comprising:
in response to the payment request being approved via the mobile phone at the second telephone number, transmitting at least one premium message to the mobile phone at the second telephone number to collect the funds.

21. The method of claim 19, further comprising:
in response to the payment request being approved via the mobile phone at the second telephone number, identifying a financial account associated with the second telephone number; and electronically communicating with a financial institution to collect funds from the financial account.

22. The method of claim 19, wherein communicating with the mobile phone at the second telephone number comprises receiving an advance approval at the server computer from the mobile phone, prior to the receiving of the payment request, and the method further comprises:
   storing the advance approval in the database; and
   approving the payment request based on the advance approval stored in the database.

23. The method of claim 22, wherein the advance approval includes a budget limit, and the approving of the payment request is based at least in part on the payment request meeting the budget limit.

24. The method of claim 23, wherein the advance approval further includes an expiration limit, and the approving of the payment request is based at least in part on the payment request being received before the expiration limit.

25. The method of claim 19, further comprising:
   communicating with a telecommunication carrier to obtain the data associating the first telephone number with the second telephone number.

26. The method of claim 19, further comprising:
   presenting a web-based user interface to a user of the first telephone number to receive the first telephone number and an age of the user; and
   in response to the age of the user being under a predetermined threshold, prompting the user to provide the second telephone number of a guardian of the user.

27. The method of claim 19, further comprising:
   receiving an indication of association between the first telephone number and the second telephone number from a user of the mobile phone at the second telephone number.

28. The method of claim 27, further comprising:
   receiving an indication of association between the first telephone number and the second telephone number from a mobile phone at the first telephone number.

29. The method of claim 19, wherein the communicating with the mobile phone at the second telephone number for approval of the payment request comprises: transmitting an electronic message to the mobile phone; and
   receiving a reply to the electronic message from the mobile phone.

30. The method of claim 29, wherein the electronic message is transmitted to the mobile phone via short message service (SMS), and the reply is received from the mobile phone via short message service (SMS).

31. The method of claim 19, wherein the communicating with the mobile phone at the first telephone number comprises receiving a confirmation message from the mobile phone at the first telephone number, and the communicating with the mobile phone at the second telephone number comprises forwarding at least a portion of the confirmation message to the mobile phone at the second telephone number.

32. The method of claim 19, further comprising:
   transmitting an electronic message to a mobile phone at the first telephone number,
   the electronic message including a code identifying the payment request; and wherein the communicating with a mobile phone at the second telephone number for approval of the payment request comprises receiving the code from the mobile phone at the second telephone number.

33. The method of claim 19, further comprising:
   receiving from a user of the mobile phone at the second telephone number at least one restriction on payment requests originated from the first telephone number;
   storing data indicating at least one restriction; and
   determining whether the payment request received at the server computer is in compliance with the at least one restriction;
   wherein the communicating with the mobile phone at the second telephone number for approval of the payment request is after a determination that the payment request received at the server computer is in compliance with the at least one restriction.

34. The method of claim 33, wherein the at least one restriction is based on at least one of: budget, time of payment requests, frequency of payment requests, and purchase category of payment requests.

35. A tangible, non-transitory computer-readable storage media storing instructions, the instructions causing a server computer to perform a method, the method comprising:
   receiving a payment request at a server computer, the payment request including a first telephone number;
   communicating with a mobile phone at the first telephone number for confirmation of the payment request, prior to the communicating with a mobile phone at a second telephone number for approval of the payment request;
   identifying the second telephone number based on data stored in a database connected to the server computer, the data associating the first telephone number with the second telephone number;
   communicating with the mobile phone at the second telephone number for approval of the payment request; and
   in response to the payment request being approved via the mobile phone at the second telephone number, processing the payment request using funds collected via the second telephone number, including collecting funds from an account associated with the second telephone number to process the payment response, after the payment request is approved via the mobile phone at the second telephone number, wherein a telecommunication carrier of the mobile phone at the first telephone number is in a first country, and the telecommunication carrier of the mobile phone at the second telephone number is in a second country different from the first country.

36. A system, comprising:
a data storage facility to store data associating a first telephone number with a second telephone number; and
an interchange coupled with the data storage facility, the interchange including a common format processor and a plurality of converters to interface with a plurality of controllers, the converters configured to communicate with the controllers in different formats, the converters to communicate with the common format processor in a common format, the common format processor to receive a payment request including the first telephone number, to communicate with a mobile phone at the first telephone number for confirmation of the payment request, prior to the communicating with a mobile phone at a second telephone number for approval of the payment request, and to identify the second telephone number based on the data stored in the data storage facility associating the first telephone number and the second telephone number, the common format processor to instruct a first controller of the controllers, via a first converter of the converters, to communicate with the mobile phone at the second telephone number for approval of the payment request, wherein the system is to process the payment request using funds collected via the second telephone number, in response to the payment request being approved via the mobile phone at the second telephone number, including collecting funds from an account associated with the second telephone number to process the payment response, after the payment request is approved via the mobile phone at the second telephone number, wherein a telecommunication carrier of the mobile phone at the first telephone number is in a first country, and the telecommunication carrier of the mobile phone at the second telephone number is in a second country different from the first country.

* * * * *